United States Patent [19]

Mamiya et al.

[11] 4,364,649
[45] Dec. 21, 1982

[54] FILM WINDING AND LENS CONTROL MECHANISM FOR AUTOMATICALLY FOCUSING CAMERA

[75] Inventors: Toshiharu Mamiya, Kawasaki; Tateo Yamada, Yokohama; Michio Hirohata, Inagi; Yukio Ogawa; Hiroyuki Kimura, both of Kawasaki, all of Japan

[73] Assignee: Canon Kabushiki Kaisha, Tokyo, Japan

[21] Appl. No.: 203,479

[22] Filed: Nov. 3, 1980

[30] Foreign Application Priority Data

Nov. 1, 1979 [JP] Japan .............................. 54-142304

[51] Int. Cl.³ .......................... G03B 3/00; G03B 17/14
[52] U.S. Cl. ..................................... 354/25; 354/204
[58] Field of Search ................ 354/25, 204, 206, 212, 354/213, 195

[56] References Cited

U.S. PATENT DOCUMENTS 4,258,998  3/1981  Lermann et al. ............... 354/195 X Primary Examiner—Michael L. Gellner
Attorney, Agent, or Firm—Toren, McGeady & Stanger

[57] ABSTRACT

In an automatically focusing camera, the lens is driven to infinity during film winding and the film winding spool is blocked when film winding is completed. Upon shutter release actuation of the camera, film winding is unblocked when the automatic focusing circuit energizes a first magnet and lens rotation is blocked at the focused position when the automatic focusing circuit energizes a second magnet. A single control member operates to effect blocking of the film winding mechanism and to drive the lens to infinity when rotated in one direction, and to unblock the film winding mechanism when rotated in the opposite direction.

11 Claims, 2 Drawing Figures

FILM WINDING AND LENS CONTROL MECHANISM FOR AUTOMATICALLY FOCUSING CAMERA

BACKGROUND OF THE INVENTION

1. Field of the Invention

The present invention relates to a winding stop release device for an automatic focus adjusting camera having an electromagnetically driven shutter.

2. Description of the Prior Art

Generally in case of the winding mechanism of a camera the shutter charge operation and the film winding operation are carried out during the winding operation, whereby when the winding operation has been completed the winding mechanism is stopped in order to prevent double winding. When one picture has been taken as a result of shutter release operation, it is necessary that the shutter charge operation and the film winding operation be again carried out by means of the winding mechanism so that the winding stop of the winding mechanism must be released.

Until now this kind of the winding stop release operation of the winding mechanism has been carried out in operative engagement with the returning operation of the members taking part in the shutter charge operation at the time of termination of the exposure operation.

However, along with the recent electrification of cameras the conventional mechanical shutter has been replaced with electromagnetically driven shutter devices. In case of an electromagnetically driven shutter, mechanical operative engagement between the release operation and the shutter opening and closing operation is not necessary, whereby versatility in a camera may be profitably increased. Because as mentioned above the charge mechanism is not necessary for a camera having an electromagnetically driven shutter, a mechanical signal cannot be obtained when the exposure operation is terminated.

Consequently, in case of a camera provided with an electromagnetically driven shutter it is not possible, in the same way as in the case of the conventional mechanical shutter, to release the winding stop in operative engagement with the termination of the exposure operation.

Furthermore, a recently developed automatic focusing camera whose focusing operation is carried out with the lens driven by the energy of a spring is becoming popular, whereby it is necessary to obtain mechanical operative engagement of the shutter opening and closing operation as well as of the lens driving starting operation with the release operation. Although when the electromagnetically driven shutter is built in the automatic focusing camera, it is possible to make it unnecessary to obtain mechanical operative engagement of the shutter opening and closing operation with the release operation as mentioned above, it decreases the freedom in designing the camera to effect mechanical operative engagement of the lens drive starting operation with the release operation for driving the lens. Thus, it becomes necessary to obtain electrically the operative engagement of the shutter opening and closing operation with the release operation. Namely, even in case of the automatic focusing camera the operative engagement of the shutter opening and closing operation as well as the lens drive starting operation with the release operation is electrically obtained so that it is very difficult to release the winding stop in operative engagement with the termination of the exposure termination.

SUMMARY OF THE INVENTION

An object of the present invention is to solve the above-mentioned shortcomings by offering a winding stop release device for the automatic focusing camera provided with an electromagnetically driven shutter, so designed that it is provided with a lens drive starting magnet for operatively engaging the lens drive starting operation with the release operation so as to carry out the winding stop release operation in operative engagement with the magnet.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DESCRIPTION OF THE PREFERRED EMBODIMENT

Figure 1:
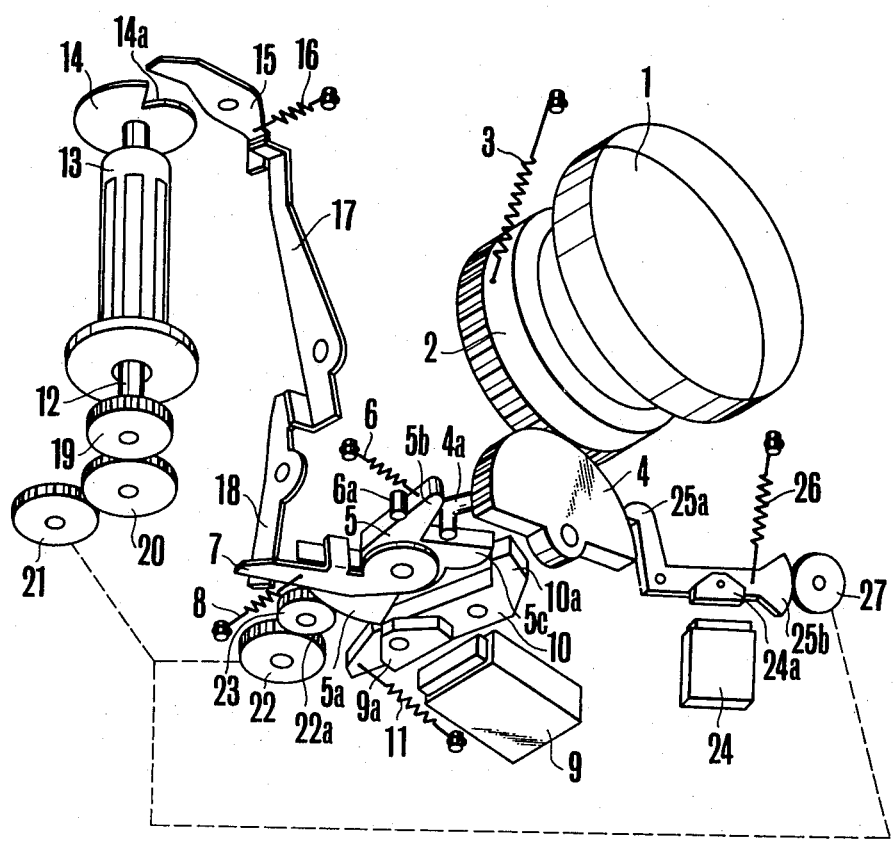
FIG. 1 is a perspective view showing an embodiment of the winding stop release device of the present invention.
Figure 2:
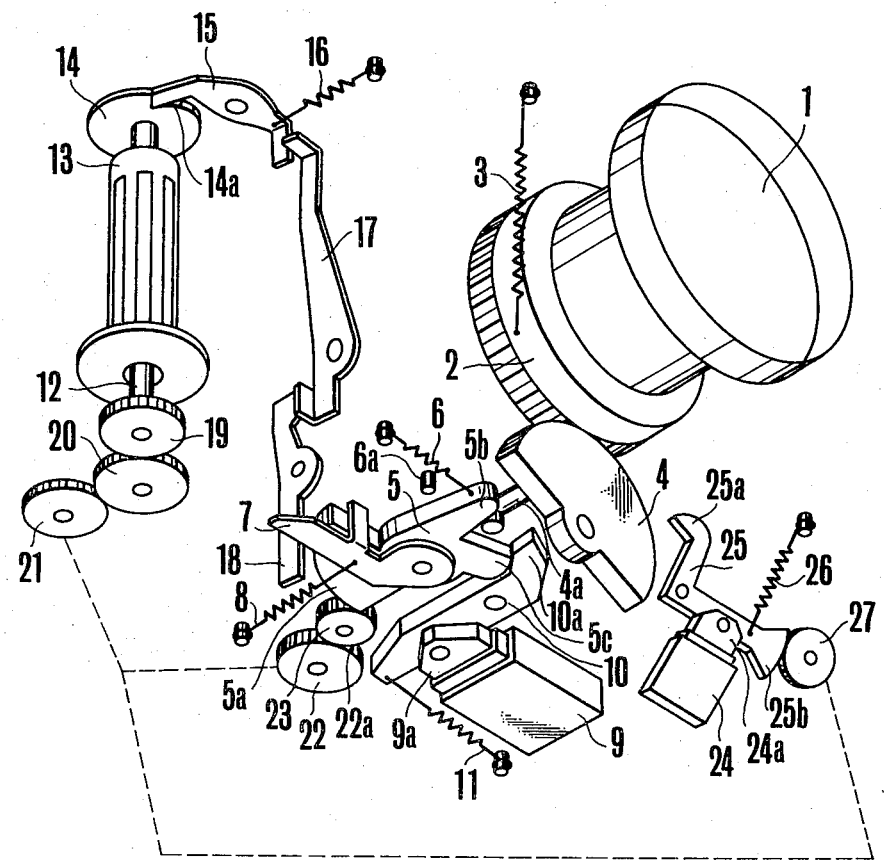
FIG. 2 is a perspective view showing the device of FIG. 1 in the state in which the winding is stopped.

FIGS. 1 and 2 show a winding stop release device for an automatic focusing camera having an electromagnetic shutter. In the drawings, 1 is a photographing lens, 2 is a lens driving ring, 3 is a spring for driving the lens driving ring 2 from a position where the lens is focused to infinity to a close range focus and 4 is a charge gear for the lens driving ring 2 having a pin 4a, whereby along with rotation of the charge gear 4 along the clockwise direction the lens driving ring 2 is rotated against the strength of the spring 3 from the close range focus position to the infinity focus position. 5 is a control member, whose one end forms a sector gear 5a and whose other end is divided into two parts, namely a projection 5b and a cam part 5c. 6 is a spring for rotating the control member 5 up to the position of the stopper 6a, whereby when the control member 5 is rotated against the strength of the spring 6 along the clockwise direction the projection 5b drives the charge gear 4 along the clockwise direction through the pin 4a. 7 is an operation lever for releasing the winding stop, being borne coaxially with the control member 5. Further, the operation lever 7 is urged by means of a spring 8 along the counter-clockwise direction, being prevented from rotation in the counterclockwise direction by means of a side surface of one end of the control member 5. 9 is a magnet with a permanent magnet for starting the lens driving ring 2, 9a is an armature of the magnet, and 10 is a holding lever of the armature 9a, whereby a spring 11 hung on one end thereof urges the holding lever 10 in a direction to bring the armature 9a into contact with the magnet 9. Further, one end of the holding lever 10 has a projection 10a, over which the cam part 5c of the control part 5 can ride. 12 is a winding shaft driven by manual or automatic winding operation, 13 is a winding spool rotated with the winding shaft 12 and 14 is a winding stop disc rotated with the winding shaft through one rotation for each exposure. 15 is a winding stop lever whose one end is engageable in a notch 14a of the winding stop drum 14. 16 is a spring for urging the winding stop lever 15 in a direction along which the winding stop lever 15 is engaged in the notch 14a of the wind stop drum 14, 17 is a first operatively engaging lever whose one end is engageable with the other end of the winding stop lever 15, and 18 is a second operatively engaging lever whose one end is engageable with the other end of the first operatively engaging lever 17, whereby with the other end of the second operatively engaging lever 18 the end of the operation lever 7 is engaged in such a manner that when the operation lever 7 is rotated with the above control member 5 along the counterclockwise direction the first and second operation levers 18 and 17 are rotated so as to release the winding stop of the winding stop lever 15. 19 is a gear to be rotated with the winding shaft 17, being engaged with a sector gear 5a of the control member 5 through a gear group consisting of gears 20, 21, 22, 23 and so on. The one gear 22 of the gear group is a notch gear. The notch gear 22 and the gear 23 are so designed that in the state in which the winding has been completed a notch 22a of the gear 22 faces the teeth of the gear 23. 24 is a magnet with a permanent magnet for stopping the driving of the lens driving ring 2, 24a is an armature of the magnet and 25 is a holding lever of the armature 24a, whereby the holding lever 25 is provided with a hook part 25a for holding a charge gear 4 and with a sector gear 25b. 26 is a spring for urging the holding lever 25 in a direction along which the hook part 25a is engaged with a charge gear 4, 27 is a notch gear to be engaged with the sector gear 25b of the holding lever 25, being engaged with the gear 21 in such a manner that along with the winding operation the armature 24a of the holding lever is attracted with the magnet 24.

Below the operation of the above-mentioned assembly will be explained, assuming the assembly is in a first state before film winding, as is shown in FIG. 1.

When in this state the winding operation is carried out manually or automatically, the winding shaft 12 is rotated along the clockwise direction, whereby the winding stop drum 14 as well as the gear 19 are rotated along the clockwise direction. Along with the rotation of the gear 19 the notch gears 22 and 27 are rotated through the gears 20 and 21, whereby because at first the notch 22a of the notch gear 22 faces to the gear 23, the gear 23 is not rotated. Further, because the notch 27a of the notch gear 27 faces the teeth of the sector gear 25b of the holding lever 25 the holding lever 25 is not rotated. When the notch gears 22 and 27 are further rotated the teeth of the notch gear 22 engage with the teeth of the gear 23, and the teeth of the notch gear 27 engage with the teeth of the sector gear 25b of the holding gear 25. Along with the rotation of the notch gear 27 the sector gear 25b is operated so as to rotate the holding lever 25, whereby the hook part 25a of the holding lever 25 is disengaged from the charge gear 4 so as to enable the rotation of the charge gear 4. The holding lever 25 rotates the armature 24a against the force of the spring 26 in such a manner that the armature 24a is brought into contact with the magnet 24. Then, the armature 24a is attracted by means of the permanent magnet of the magnet 24. Further, when the armature 24a is brought in contact with the magnet 24, the notch 27a of the notch gear 27 faces the teeth of the sector gear 25b of the holding lever 25.

One the other hand, along with the rotation of the notch gear 22, the gear 23 is rotated. Thus, because of the engagement of the sector gear 5a with the gear 23 the control member 5 is rotated against the force of the spring 6 along the clockwise direction. Thus, the projection 5b of the control member 5 acts upon the pin 4a of the charge gear 4 so as to rotate the charge gear 4 along the clockwise direction. Along with the rotation of the charge gear 4 along the clockwise direction the lens driving ring 2 is rotated against the force of the spring 3 from the close range focus position to the infinity focus position. Further, along with the rotation of the control member 5 along the clockwise direction the cam part 5c is brought out of the position in which the cam part 5c lies over the projection 10a of the holding lever 10 into the position in which it has fallen into the stepped part as is shown in FIG. 2. Thus, the holding lever 10 is disengaged from the cam part 5c of the control member 5, so that the holding lever 10 is rotated by means of the spring 11 in such a manner that the armature 9a is brought into contact with the magnet 9, whereby the armature 9a is attracted by means of the magnetic flux of the permanent magnet of the magnet 9. This time corresponds to the time at which the armature 24a is attracted by means of the permanent magnet of the magnet 24 and further to the time at which the lens driving ring has been rotated into the infinity focus position. Along with the attraction of the armature 9a by means of the magnetic flux of the permanent magnet of the magnet 9 the projection 10a of the lever 10 holding the armature 9a engages with the cam part 5c so as to prevent the control member from rotation by means of the spring 6. Further, along with the rotation of the control member 5 along the clockwise direction the operation lever 7 is also rotated so as to disengage the end of the operation lever 7 from the other end of the second operationally engaging lever 18. Thus, the first operationally engaging lever 17 is disengaged from the winding stop lever 15 so that the winding stop lever 15 is rotated by means of the spring 16 along the counterclockwise direction so as to be brought into contact with the side edge of the wind stop drum 14. When along with the winding operation the film winding and the rotation of the lens driving ring 2 into the infinity focus position have been completed, the winding stop lever 15 is engaged into the notch 14a of the winding stop drum 14 so as to actuate the winding stop, whereby further winding operation is impossible. At the same time the notch 22a of the notch gear 22 faces the teeth of the gear 23 again. This state corresponds to that shown in FIG. 1.

When in this state the release button not shown in the drawing is pushed, the magnet 9 is excited through a control circuit not shown in the drawing. Thus, the magnetic flux produced with the magnet 9 is compensated with that produced with the permanent magnet so that the armature 9a is no longer attracted with the magnet 9. The strength of the spring 6 is set larger than that of the spring 11 so that when the armature 9a is no longer attracted with the magnet 9 the control member 5 is rotated along the counterclockwise direction, whereby the cam part 5c of the control member 5 runs over the projection 10a of the holding lever 10. While, the cam part 5c runs over the projection 10a the armature 9a is distant from the magnet 9. Although at this time the state in which the winding is stopped, is kept by means of the winding stop lever 15, the control member 5 is able to rotate along the counterclockwise direction up to the position of the stopper 6a because the teeth of the gear 23 face the notch 22a of the notch gear 22. Along with the rotation of the control member 5 the projection 5b is withdrawn from the pin 4a of the charge gear 4 so that the lens driving ring 2 is rotated by means of the spring 3 along the clockwise direction. When the lens 1 has been driven into the in-focus position, an in-focus signal current is given to the magnet 24 from a conventional automatic focusing circuit. Thus, the magnetic flux produced by means of the magnet 24 is compensated with that of the permanent magnet of the magnet 24 in such a manner that the armature 24a is no longer attracted with the magnet 24 so that the hook part 25a of the holding lever 25 with the armature 24a is engaged with the charge gear 4 so as to stop the lens driving ring 2. In this way, the focusing of the lens 1 is carried out. The driving control of the electromagnetically driven shutter is carried out by means of the in-focus signal from the automatic focusing circuit so as to carry out the exposure of the film. Along with the rotation of the above-mentioned control member 5 along the counterclockwise direction the operation lever 7 urges the wind stop lever 15 against the strength of the spring 16 through the second and the first operatively engaging levers 18 and 17 so as to disengage the winding stop lever 15 from the winding stop drum.

In the above-mentioned embodiment the winding stop release operation is carried out by means of the lens driving magnet 9, while the winding stop release operation can also be carried out by means of the lens driving stop magnet 24. At this time, along with the rotation of the holding lever 25 by means of the spring 26 the other end of the second operatively engaging lever 18 is pushed in such a manner that the winding is stopped in a state of the holding lever 25 such that the armature 24a is attracted with the magnetic flux of the permanent magnet of the magnet 24.

While a specific embodiment of the invention has been shown and described in detail to illustrate the application of the inventive principles, it will be understood that the invention may be embodied otherwise without departing from such principles.

What is claimed is:

1. A winding stop release device for the automatic focusing camera provided with an electromagnetically driven shutter comprising:
   a photographing lens, said lens having a distance adjusting ring;
   an urging means for driving the distance adjusting ring from the infinite position to the very near position respectively from the very near position to the infinite position;
   a winding member;
   a winding stop member for stopping the winding operation of the winding member, said member being brought into the winding stop position at the termination of the winding operation of the winding member;
   a winding stop release member for moving the winding stop member from the winding stop position to the winding stop release position;
   a control member inserted between the winding member and the charge member, said member being movable between the first position in which the winding stop release member is operated, while the charge member is released from the holding of the charge state to the second position in which the winding stop release member is made non-operative, while the charge member is kept in the charge state, whereby during the movement from the first position to the second position the winding power of the winding member is transferred to the charge member; and
   a magnet for keeping the control member in the second position, said magnet enabling the control member to move from the second position to the first position by means of controlling the current supply.

2. A winding stop release device in accordance with claim 1, wherein the control means having other urging means than the above so as to be moved from the second position to the first position.

3. A winding stop release device in accordance with claim 2, wherein the above urging means and another one are springs.

4. A winding stop release device in accordance with claim 1, wherein the magnet being the one having a permanent magnet and having an armature and the holding member for the armature, whereby along with the movement of the control member from the first position to the second position the armature becomes attractable with the permanent magnet, along with the attraction of the armature the control member is kept in the second position by means of the holding member and along with the current supply to the magnet the attraction of the armature is released so as to release the holding of the control member at the second position by means of the holding member.

5. A winding stop release device in accordance with claim 1, further comprising a stop member for stopping the driving of the distance adjusting ring at the in-focus position when the distance adjusting ring is driven from the infinite position to the very near position respectively from the very near position to the infinite position.

6. A winding stop release device in accordance with claim 5, wherein the stop member having another magnet than the above.

7. A winding stop release device in accordance with claim 6, wherein the signal for controlling another magnet is also made use of as the signal for controlling the driving the electromagnetically driven shutter.

8. A winding stop release device for the automatic focusing camera provided with the electromagnetically driven shutter comprising:
   a winding member;
   a winding stop member for stopping the winding of the winding member, said member moving to the winding stop position when the winding operation of the winding member has been terminated;
   a control member movable between the first position at which the winding stop release member is operated and the second position at which the winding stop release member is made non-operative, said member having an urging member for moving said member from the second position to the first position, while said member being moved from the first position to the second position in accordance with the winding operation of the winding member;
   a photographing lens, said lens having a distance adjusting ring to be driven from the infinite position to the very near position respectively from the very near position to the infinite position; and
   a magnet for controlling the driving of the distance adjusting ring, the current supply to the magnet being controlled in such a manner that the state in which the magnet holds the control member at the second position is converted into the state in which the holding is released.

9. An operating mechanism, particularly for a camera having an electromagnetically driven shutter and including lens means adapted to be focused by movement between a first and a second lens position and film winding means, comprising:

control means adapted to be pivoted between a first and a second control position;

first interconnecting means interposed between said control means and said lens means for driving said lens means to said first lens position when said control means is driven to said first control position;

second interconnecting means interposed between said film winding means and said control means for driving said control means to said first control position upon actuation of said film winding means;

film winding stopper means operatively interposed between said control means and said film winding means to block operation of said film winding means when said control means is driven to said first control position and to automatically unblock said film winding means when said control means is moved to said second control position;

first electromagnetic means for holding said control means in said first control position and for releasing said control means to return to said second control position upon actuation of said first electromagnetic means;

means biasing said control means toward said second control position;

lens holding means adapted to engage said lens means to hold said lens means in a focused position;

third interconnecting means operatively interposed between said film winding means and said lens holding means to disengage said lens holding means from said lens means upon actuation of said film winding means;

second electromagnetic means for holding said lens holding means in a position disengaged from said lens means and for releasing said lens holding means upon actuation of said second electromagnetic means;

means biasing said lens holding means toward a position in engagement with said lens means;

means for actuating said first electromagnetic means upon shutter release actuation of said camera; and means for actuating said second electromagnetic means when said lens means has reached a desired focused position.

10. A mechanism according to claim 9 wherein said control means comprises a control member having a first control arm, a second control arm, and a third control arm, said first control arm operating to engage said first interconnecting means to drive said lens means to said first lens position when said control member is driven to said first control position and to disengage from said first interconnecting means when said control member is driven to said second control position, said second control arm operating to engage said film winding stopper means to unblock said film winding means when said control member moves to said second control position and to engage said film winding stopper means to block said film winding means when said control member moves to said first control position, said third control arm being adapted to be engaged by said first electromagnetic means to retain said control member in said first position and to be released by said first electromagnetic means upon actuation thereof.

11. A mechanism according to claim 10 further including control member stop means adapted to engage said first control arm to stop movement of said control member at said second control position.

* * * * *